(12) United States Patent
Miyashita et al.

(10) Patent No.: US 7,583,003 B2
(45) Date of Patent: Sep. 1, 2009

(54) STATOR FOR MOTORS

(75) Inventors: Toshihito Miyashita, Nagano (JP);
Hiroshi Hioki, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 403 days.

(21) Appl. No.: 11/539,417

(22) Filed: Oct. 6, 2006

(65) Prior Publication Data

US 2007/0080600 A1    Apr. 12, 2007

(30) Foreign Application Priority Data

Oct. 6, 2005    (JP) ............................. 2005-294044

(51) Int. Cl.
*H02K 1/14* (2006.01)
*H02K 1/16* (2006.01)
*H02K 1/18* (2006.01)
*H02K 5/04* (2006.01)

(52) U.S. Cl. ...................... 310/216; 310/194; 310/218; 310/254

(58) Field of Classification Search ......... 310/216–218, 310/254, 194
See application file for complete search history.

(56) References Cited

U.S. PATENT DOCUMENTS

| | | | |
|---|---|---|---|
| 6,335,582 B1 * | 1/2002 | Abukawa et al. | 310/214 |
| 6,348,753 B1 * | 2/2002 | Sakai et al. | 310/254 |
| 6,483,221 B1 * | 11/2002 | Pawellek et al. | 310/216 |
| 2001/0030486 A1 * | 10/2001 | Pijanowski | 310/254 |
| 2004/0021393 A1 * | 2/2004 | Suzuki et al. | 310/218 |

FOREIGN PATENT DOCUMENTS

| | | |
|---|---|---|
| DE | 199 61 339 | 7/2001 |
| EP | 0 849 857 | 6/1998 |
| JP | 02-254947 | 10/1990 |
| JP | 08-126231 | 5/1996 |
| JP | 11-187594 | 7/1999 |
| JP | 2000-278893 | 10/2000 |
| JP | 2000-350391 | 12/2000 |
| JP | 2001-298883 | 10/2001 |
| JP | 2003-244881 | 8/2003 |

\* cited by examiner

*Primary Examiner*—Tran N Nguyen
(74) *Attorney, Agent, or Firm*—Rankin, Hill & Clark LLP

(57) ABSTRACT

The present invention provides a stator for motors in which a space volume occupied by the winding wire of an excitation winding section can be increased, thereby allowing magnetic flux to readily flow through the yoke. On an inner peripheral surface portion of the yoke 7, a pair of flat-surface portions 7b are respectively formed in the circumferential direction on either sides of six fitted recesses 7a so that the flat-surface portions are continuous with the inner surfaces of the fitted recesses 7a. The pair of flat-surface portions 7b are located on the same virtual plane and have a side of an identical dimension that extends in the circumferential direction. The inner surface of the fitted recess 7a is constituted by a pair of inclined flat surfaces 7c respectively continuous with the pair of flat-surface portions 7b. The first flange portion 23b of the bobbin 23, which is in contact with the inner peripheral surface of the yoke 7, includes a flat plate-like body 23d and a pair of ribs 23e. With the excitation winding section 5 being mounted onto the stator core 3, the pair of ribs 23e are fitted into a pair of spaces 19 formed between the yoke 7 and the magnetic pole constituent member 9.

6 Claims, 6 Drawing Sheets

STATOR FOR MOTORS

FIELD OF THE INVENTION

The present invention relates to a stator for motors.

BACKGROUND OF THE INVENTION

Japanese Patent No. 2816698 discloses a stator for motors that comprises a stator core including a substantially annular yoke and a magnetic pole constituent member arranged inside the annular yoke, and an excitation winding section arranged at a magnetic pole constituent member. The magnetic pole constituent member integrally includes a plurality of pole columns, each of which has one end connected to an inner surface of the yoke, magnetic pole surface constituent sections respectively arranged on the other ends of the plurality of pole columns, and connecting portions connecting two adjoining magnetic pole surface constituent sections. The yoke and the magnetic pole constituent member are respectively formed by overlaying a plurality of magnetic steel plates. In the inner peripheral surface of the yoke, a plurality of fitted recesses, which are open toward both sides of the overlaying direction of the magnetic steel plates and also open toward the magnetic pole constituent members, are formed. The one ends of the pole columns are fitted into these fitted recesses. This arrangement is shown in FIGS. 1 to 4 of Japanese Patent No. 2816698.

In a conventional stator for motor, however, the inner peripheral surface of the annular yoke is curved in a form of an arc. Thereby, a lateral cross-sectional shape of a space, which is formed on both sides of the pole column for receiving an excitation winding section, is a fan in shape. As a result, a configuration of the excitation winding section is restricted by the configuration of this space, and there has been a limitation in increasing a space volume occupied by the winding wire of the excitation winding section.

SUMMARY OF THE INVENTION

An object of the present invention is to provide a stator for motors in which a space volume occupied by the winding wire can be increased, thereby allowing magnetic flux to readily flow through the yoke.

Another object of the present invention is to provide a stator for motors in which the need of curving a yoke-side flange portion of a bobbin wound with the winding wire is eliminated, thereby increasing a space volume occupied by the winding wire of the excitation winding section.

Still another object of the present invention is to provide a stator for motors in which the mechanical strength of the yoke-side flange portion of the bobbin can be prevented from being reduced.

Accordingly, the present invention is directed to a stator for motors which comprises a stator core including an annular yoke and a magnetic pole constituent member arranged inside the annular yoke, and N excitation winding sections (N is an integer of three or more) arranged at the magnetic pole constituent member. The magnetic pole constituent member includes N pole columns that are mounted respectively with the excitation winding sections. The N pole columns are arranged inside the annular yoke at an interval in a circumferential direction of the yoke, and each of the pole columns has one end connected to the yoke and the other end positioned on an inner side than the one end in a radial direction. A plurality of magnetic pole surface constituent sections are respectively formed on the other ends of the N pole columns, each having on its inner side a magnetic pole surface. The magnetic pole constituent member further includes a plurality of connecting portions respectively connecting two adjoining sections among the magnetic pole surface constituent sections. The yoke and the magnetic pole constituent member are respectively formed by overlaying a plurality of magnetic steel plates. In an inner peripheral portion of the yoke, N fitted recesses, which are open toward both sides of an overlaying direction of the plurality of magnetic steel plates and also toward the magnetic pole constituent member, are formed and are respectively fitted with the one ends of the N pole columns. On the inner peripheral portion of the yoke of the present invention, a pair of flat-surface portions are formed continuously with an inner surface of the fitted recess, and are respectively disposed on either side of the fitted recess in the circumferential direction. The pair of flat-surface portions are located on the same virtual plane, having a side of an identical dimension that extends in the circumferential direction.

In a conventional stator for motors, since the yoke is a circle in shape, a space having a fan-shaped cross section is formed on both sides of the pole column to receive the excitation winding section. When the excitation winding section is formed by winding a winding wire around the pole column, a comparatively big gap is formed between the excitation winding section and the curved inner peripheral surface of the yoke. In contrast therewith, in the present invention a pair of flat-surface portions are respectively formed in the circumferential direction on either side of the fitted recess in the inner peripheral surface of the yoke. With this arrangement, the space receiving the excitation winding section is shaped to allow the winding wire of the excitation winding section to regularly turn along the pair of flat-surface portions formed on the inner peripheral portion of the yoke. Thus, a big gap is not formed between the pair of flat-surface portions and the excitation winding sections formed by winding the winding wires around the pole columns. Thereby, a space volume occupied by the winding wire of the excitation winding section can be increased. Further, a cross-sectional area of the yoke can partially be enlarged, thereby allowing magnetic flux to readily flow through the yoke.

The excitation winding section may include a bobbin made from an insulating material and fitted with the pole column and a winding wire wound around the bobbin. In this case, the bobbin may include a cylindrical portion which is fitted with the pole column and around which the winding wire is wound, a first flange portion arranged on one end of the cylindrical portion to be in contact with the inner peripheral surface of the yoke, and a second flange portion arranged on the other end of the cylindrical portion to be in contact with the magnetic pole surface constituent section. The fitted recess and the first flange portion of the bobbin may be shaped so that a part of the first flange portion can be fitted into the fitted recess. With this arrangement, the mechanical strength of the first flange portion that is in contact with the inner peripheral surface of the yoke can be increased by fitting a part of the first flange portion into the fitted recess. Thereby, a thickness dimension of the first flange portion that is in contact with the pair of flat-surface portions can be reduced. As a result, a space volume occupied by the winding wire of the excitation winding section can be increased even when the bobbin is used.

More specifically, the bobbin is configured in such a manner that the first flange portion includes a flat plate-like body extending along the inner peripheral surface of the yoke and a pair of ribs rising from the body toward the yoke. The inner surface of the fitted recess is constituted by a pair of inclined flat surfaces which are respectively continuous with the pair of flat-surface portions. It is preferred that sides of the pair of inclined flat surfaces that extend in the circumferential direction are sized to form a pair of spaces between the pair of inclined flat surfaces and the one end of the pole column fitted into the fitted recess so that the pair of ribs of the bobbin may respectively be fitted into the pair of spaces. With this arrangement, a part of the first flange portion can be fitted into the fitted recess with such a simple construction that the inner surface of the fitted recess is constituted by a pair of inclined flat surfaces. The bobbin is disposed in a right position by engagement of the ribs into the fitted recesses. As for the first flange portion, a portion where the ribs exist is thicker than other portions. As a result, even if the flat plate-like body of the first flange portion is made thinner to enlarge a volume of the space receiving the winding wire as much as possible, it is possible to prevent the mechanical strength of the first flange portion from being reduced.

If an inner surface of the first flange portion and an inner surface of the second flange portion of the bobbin face each other and extend in parallel to each other, it is possible to wind the winding wire around the cylindrical portion in a regular winding manner. With this arrangement, a space volume occupied by the winding wire of the excitation winding section can be further increased.

Further, a cross-sectional shape of the inner peripheral portion of the yoke, as taken in a direction orthogonal to the overlaying direction of the magnetic steel plates, may be a regular N-polygon with the N fitted recesses being respectively formed in substantially the centers of respective sides of the regular N-polygon. One end of the pole column may be a triangle in shape. In this case, when a distance between an apex of the triangle shape portion of the one end of the pole column and a central point of the stator core is defined as R, a width dimension in a direction orthogonal to an extending direction from the one end to the other end of the pole column is defined as T, a distance between a base of the triangle shape portion of the pole column and the central point is defined as x, and a distance between the central point and a point of intersection where a virtual line, which orthogonally crosses one side of the regular N-polygon and passes through the central point, intersects with the one side of the regular N-polygon is defined as H, the N, the T, and the R preferably satisfy the following relationship:

$$T<=2R(1-\cos(\pi/N))/\tan(\pi/N)$$

Where π=180 degrees.

In addition, the H, the x and the R satisfy a relationship of H<x<R. With this arrangement, a stator core can be formed without disturbing a flow of effective magnetic flux which contributes to torque generation, and magnetic circuits can optimally be designed.

According to the present invention, a pair of flat-surface portions are respectively disposed in the circumferential direction on either side of the fitted recess formed in the inner surface of the yoke. With this arrangement, the space receiving the excitation winding section is shaped to allow the winding wire of the excitation winding section to regularly turn along the pair of flat-surface portions formed on the inner peripheral portion of the yoke. Thus, a space volume occupied by the winding wire of the excitation winding section can be increased. Further, a cross-sectional area of the yoke can be partially enlarged in the vicinity of one end of the pole column, and magnetic flux can readily flow through the yoke.

DESCRIPTION OF THE PREFERRED EMBODIMENTS

Figure 1:
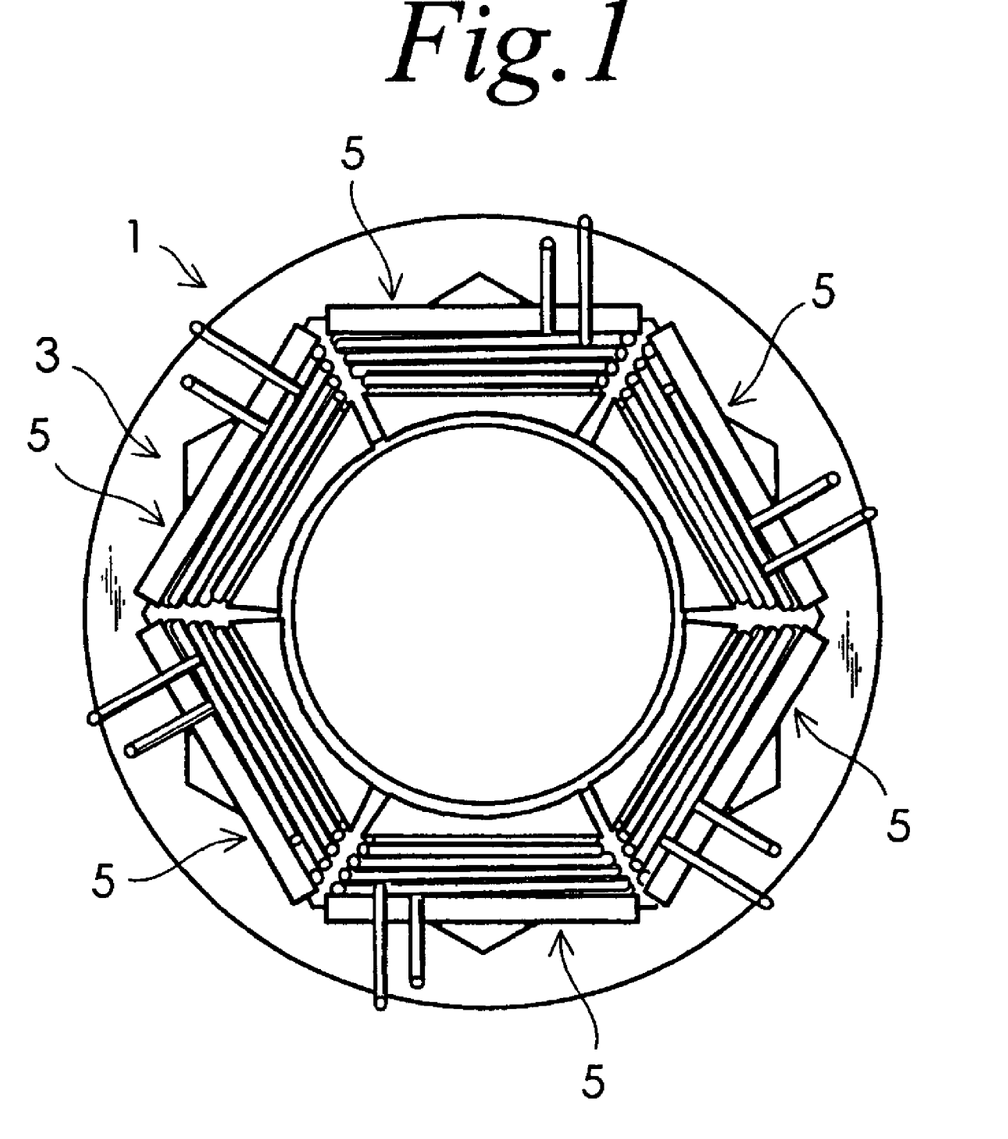
FIG. 1 is a front view of a stator for motors according to a first embodiment of the present invention.
Figure 2:
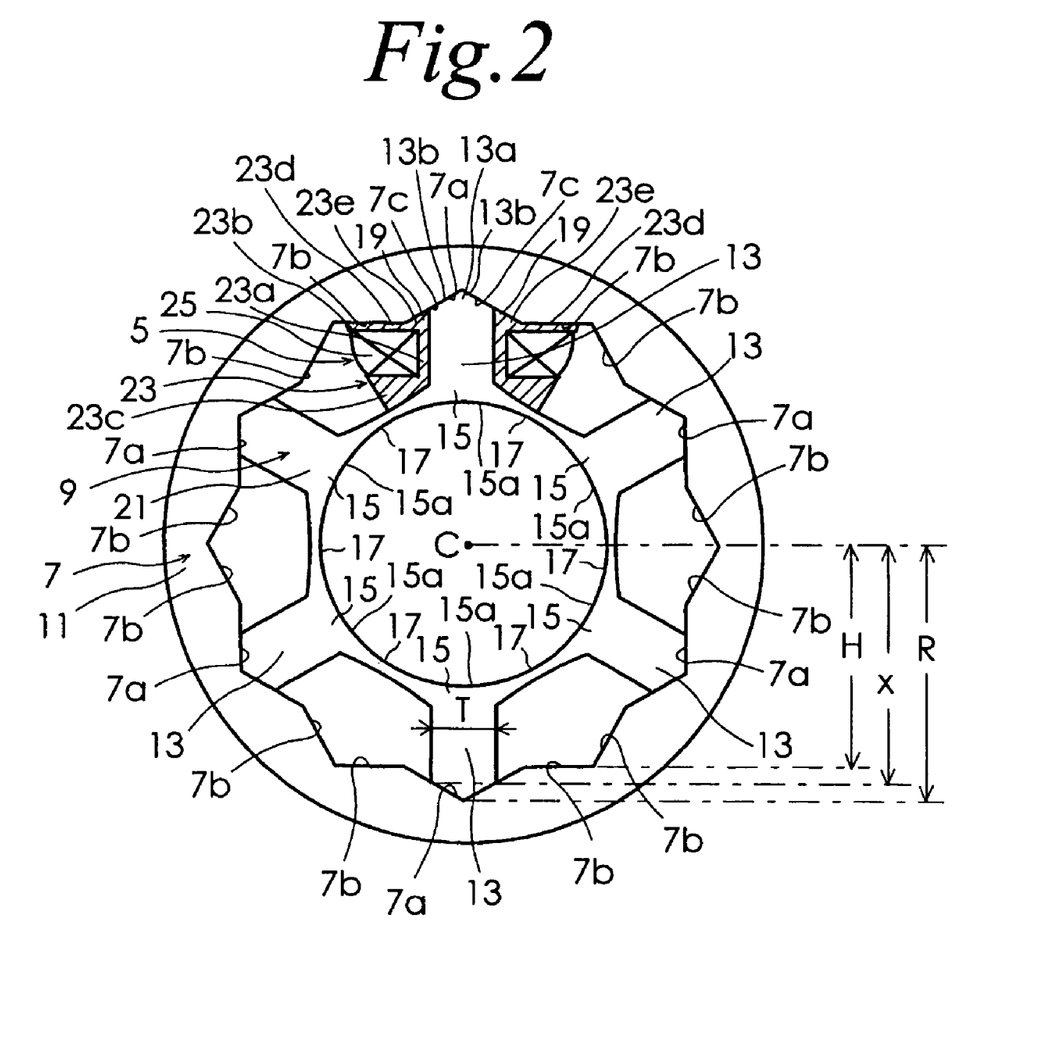
FIG. 2 is a front view of a stator core used in the stator of FIG. 1.

Preferred embodiments of the present invention will now be described in detail with reference to the accompanying drawings. FIG. 1 is a front view of a stator for motors according to a first embodiment of the present invention. As shown in the figure, a stator 1 for motors of this embodiment comprises a stator core 3 and six excitation winding sections 5. The stator core 3 includes an annular yoke 7 and a magnetic pole constituent member 9 arranged inside the annular yoke 7 as shown in FIG. 2. For the illustrative purpose, only one excitation winding section 5 is shown in FIG. 2. The yoke 7 is formed by overlaying a plurality of magnetic steel plates 11 for forming a yoke. A cross-sectional shape of an outer peripheral portion of the yoke 7, as taken in a direction orthogonal to the overlaying direction of the magnetic steel plates 11 for forming a yoke, is a circle. Also, a cross-sectional shape of an inner peripheral portion of the yoke 7, as taken in a direction orthogonal to the overlaying direction of the magnetic steel plates 11 for forming a yoke, is a regular N-polygon (a right hexagon in this embodiment) with the N fitted recesses 7a being respectively formed in substantially the centers of respective sides of the regular N-polygon. For this reason, the fitted recesses 7a are formed in the inner peripheral portion of the yoke 7 to be open toward both sides of the overlaying direction of the plurality of magnetic steel plates and also toward the magnetic pole constituent member 9. Further, a pair of flat-surface portions 7b are formed continuously with an inner surface of the fitted recess 7a in a circumferential direction, and the flat-surface portions are respectively disposed in the circumferential direction on either sides of the six fitted recesses 7a in the inner peripheral surface of the yoke 7. The pair of flat-surface portions 7b are located on the same virtual plane and have a side of an identical dimension that extends in the circumferential direction. The inner surface of the fitted recess 7a is constituted by a pair of inclined flat surfaces 7c that are continuous with the pair of flat-surface portions 7b respectively.

The magnetic pole constituent member 9 includes N pole columns (N is an integer of three or more; 6 or six in this embodiment) 13, magnetic pole surface constituent sections 15 respectively arranged on one ends of the pole columns 13, and connecting portions 17 connecting two adjoining sections among the magnetic pole surface constituent sections 15. The pole columns 13 are arranged inside the annular yoke at an interval in the circumferential direction of the yoke 7.

Each of the pole columns has one end connected to the yoke 7 and the other end positioned on an inner side than the one end in a radial direction. In this case, the one end of each of the pole columns 13 has a triangle shape portion 13a. Thereby, the triangle shape portion 13a has a pair of inclined surfaces 13b extending in the circumferential direction of the yoke 7. The triangle shape portion 13a is fitted into the fitted recess 7a of the yoke 7 in such a manner that the pair of inclined surfaces 13b are respectively abutted onto the pair of inclined flat surfaces 7c. In this manner, each of the pole columns 13 is connected to the yoke 7. In this embodiment, a length of the inclined surface 13b in the circumferential direction of the yoke 7 is shorter than that of the inclined flat surface 7c in the circumferential direction of the yoke 7. Thereby, the pair of inclined flat surfaces 7c are partially exposed toward the pole column 13 to form a pair of groove-like spaces 19, of which cross sections are a triangle in shape, between a part of the pair of inclined flat surfaces 7c and the pole column 13. The magnetic pole surface constituent sections 15 are respectively formed on the other ends of the pole columns, and each of the sections has on its inner side a magnetic pole surface 15a facing the rotor. The rotor, not shown, is disposed in a space surrounded by the magnetic pole surfaces 15a.

Figure 3:
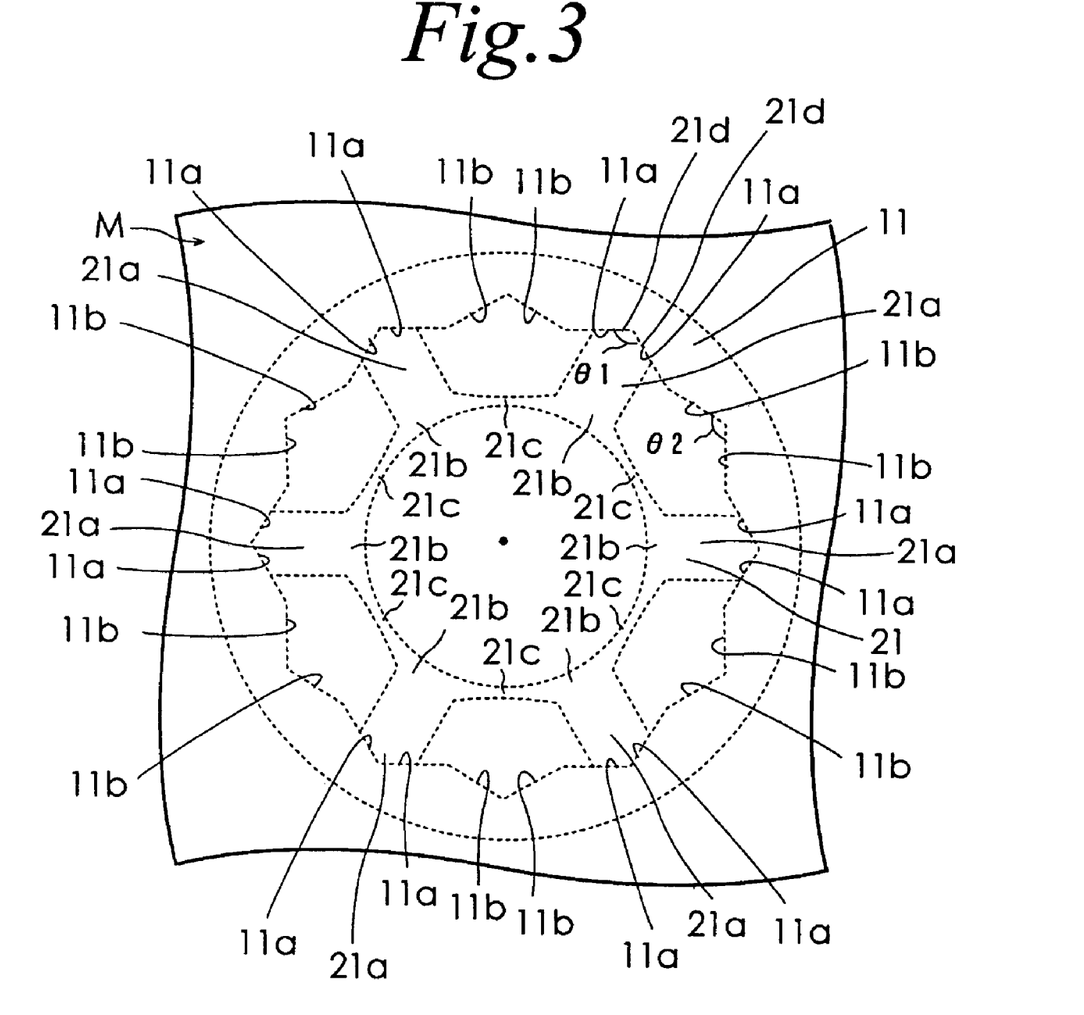
FIG. 3 illustrates how to punch out a magnetic steel plate for forming a yoke and a magnetic steel plate for forming a magnetic pole that are used in the stator of FIG. 1 from a sheet-steel material.

The magnetic pole constituent member 9 is formed by overlaying a plurality of magnetic steel plates 21 for forming magnetic poles in a similar manner in which the yoke 7 is formed. As shown in FIG. 3, one magnetic steel plate 11 for forming the yoke 7 and one magnetic steel plate 21 for forming the magnetic pole constituent member 9 are produced by punching out a sheet of sheet-steel material M by means of press working. The magnetic steel plate 11 for forming the yoke has on its inner side a flat-surface portion forming part 11a for forming the flat-surface portion 7b of the yoke 7, and an inclined flat-surface forming part 11b for forming the inclined flat surface 7c of the yoke 7.

The magnetic steel plate 21 for forming magnetic poles has a pole column forming part 21a for forming the pole column 13, a magnetic pole surface forming part 21b for forming the magnetic pole surface constituent section 15, and a connection forming part 21c for forming the connecting portion 17. The pole column forming part 21a has an inclined surface forming part 21d for forming the inclined surface 13b. Thus, a part of two adjoining flat-surface portion forming parts 11a of the magnetic steel plate 11 for forming the yoke and two adjoining inclined surface forming parts 21d of the magnetic steel plate 21 for forming magnetic poles are cut off by press working. In a subsequent process, the pole column 13 and the yoke 7 are connected to each other in such a manner that the inclined surface forming parts 21d are respectively abutted onto the inclined flat-surface forming parts 11b. According to the manner in which they are connected, an angle θ1 formed between two adjoining inclined surface forming parts 21d and an angle θ2 formed between two adjoining inclined flat-surface forming parts 11b may be defined appropriately. For example, in order to readily connect the pole column 13 and the yoke 7, the angle θ1 may be defined slightly smaller than the angle θ2. In order to tightly connect the pole column 13 and the yoke 7, the angle θ1 may be defined substantially the same as the angle θ2, or slightly larger than the angle θ2.

As shown in FIG. 2, the excitation winding section 5 includes a bobbin 23 which is made from an insulating material and fitted with the pole column 13, and a winding wire 25 which is wound around the bobbin 23. The bobbin 23 integrally includes a cylindrical portion 23a fitted with the pole column 13, a first flange portion 23b arranged on one end of the cylindrical portion 23a to be in contact with the inner peripheral surface of the yoke 7, and a second flange portion 23c arranged on the other end of the cylindrical portion 23a to be in contact with the magnetic pole surface constituent section 15. An inner surface of the first flange portion 23b and an inner surface of the second flange portion 23c face each other and extend in parallel to each other. The winding wire 25 is wound around the cylindrical portion 23a in a regular winding manner. The first flange portion includes a flat plate-like body 23d extending from the cylindrical portion 23a, and a pair of ribs 23e. The pair of ribs 23e are disposed on an opposite side to the cylindrical portion 23a, and are rising or projecting from the body 23d toward the yoke 7. The pair of ribs 23e, of which the cross sections are a triangle in shape, extend in an overlaying direction of the magnetic steel plates 11 for forming the yoke. With the excitation winding section 5 being mounted onto the stator core 3, the body 23d is in contact with the pair of flat-surface portions 7b, and the pair of ribs 23e are fitted into the pair of spaces 19 formed between the yoke 7 and the magnetic pole constituent member 9. Namely, the fitted recess 7a of the yoke 7 and the first flange portion 23b of the bobbin are shaped so that a part of the flange portion 23b (that is, the pair of ribs 23e) may be fitted into the fitted recess 7a. In other words, sides of the pair of inclined flat surfaces 7c extending in the circumferential direction are sized to form the pair of spaces 19 between the pair of inclined flat surfaces 7c of the fitted recess 7a and the one end (triangle shape portion 13a) of the pole column 13 fitted into the fitted recess 7a so that the pair of ribs 23e of the first flange portion 23b of the bobbin 23 may respectively be fitted into the pair of spaces 19.

In the stator core 3 of this embodiment, when a distance between an apex of the triangle shape portion of the one end of the pole column 13 and a central point C of the stator core 3 is defined as R, a width dimension in a direction orthogonal to an extending direction from the one end to the other end of the pole column 13 is defined as T, a distance between a base of the triangle shape portion 13a of one end of the pole column 13 and the central point C is defined as x, and a distance between the central point and a point of intersection where a virtual line, which orthogonally crosses one side of the regular N-polygon and passes through the central point, intersects with the one side of the regular N-polygon is defined as H, the N, the T, and the R can satisfy a relationship of $T <= 2R(1-\cos(\pi/N))/\tan(\pi/N)$. Further, the H, the x, and the R satisfy a relationship of $H < x < R$.

Figure 4:
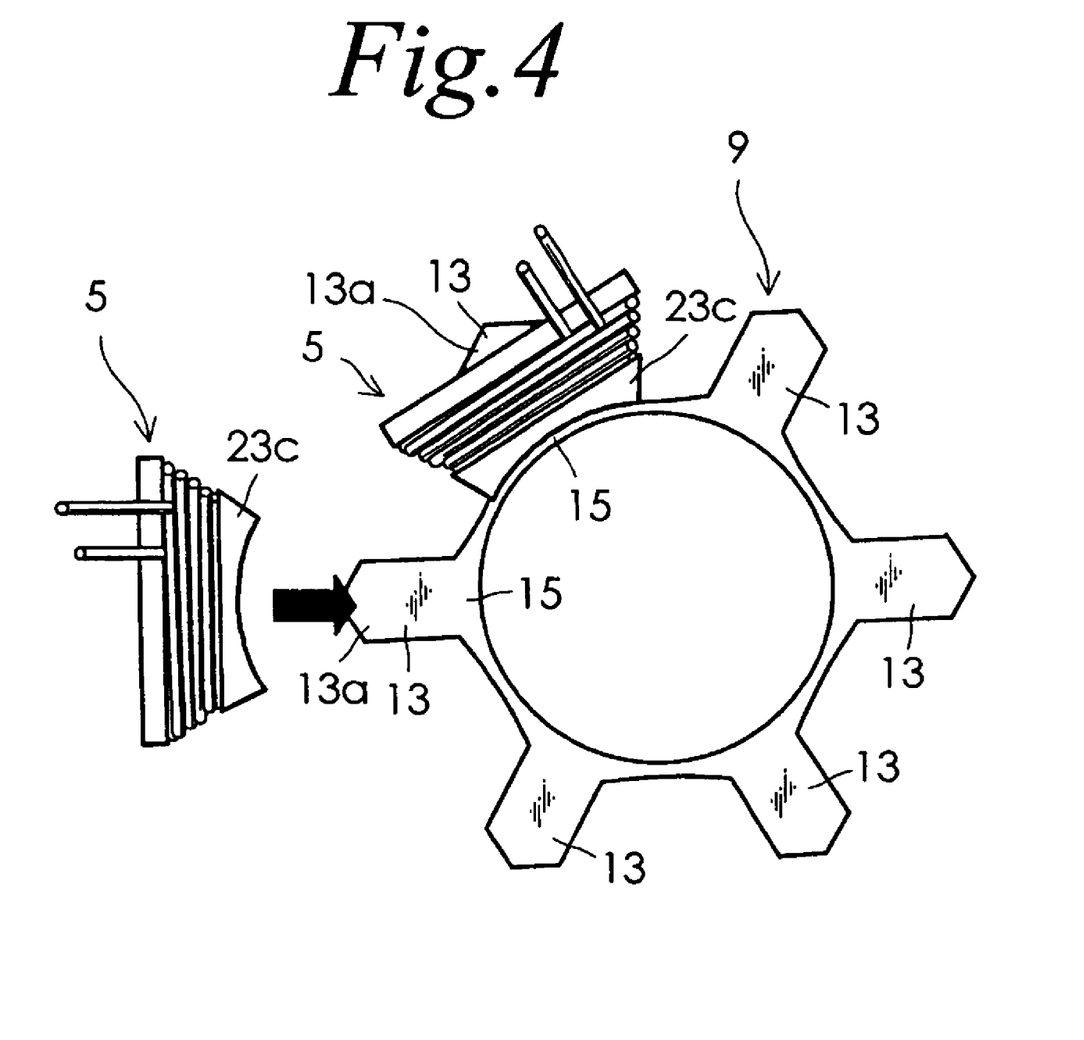
FIG. 4 illustrates how to assemble the stator of FIG. 1.

In this embodiment, the stator 1 is assembled in accordance with the following procedure. First, the excitation winding section 5 is formed by winding the winding wire 25 around the bobbin 23. Next, as shown in FIG. 4, the excitation winding section 5 is fitted with the pole column 13 of the magnetic pole constituent member 9. With this arrangement, the pair of second flange portions 23c of the bobbin 23 are in contact with the magnetic pole surface constituent section 15 of the magnetic pole constituent member 9. Then, the magnetic pole constituent member 9 attached with the excitation winding section 5 is mounted onto the yoke 7 by fitting the triangle shape portion 13a of the pole column 13 into the fitted recess 7a of the yoke 7. With this arrangement, the pair of bodies 23d of the bobbin 23 are in contact with the pair of flat-surface portions 7b respectively, and the pair of ribs 23e are fitted into the pair of spaces 19 formed between the yoke 7 and the magnetic pole constituent member 9.

According to the stator 1 of this embodiment, the pair of flat-surface portions 7b are respectively formed in the circumferential direction on either side of the fitted recess 7a on the inner peripheral portion of the yoke 7. With this arrangement, the space receiving the excitation winding sections is shaped to allow the winding wire 25 of the excitation winding section 5 to regularly turn along the pair of flat-surface portions 7b formed on the inner peripheral portion of the yoke 7. Thus, in contrast with the conventional stators, a big gap is not formed between the pair of flat-surface portions 7b and the excitation winding sections 5 formed by winding the winding wires 25 around the pole columns 13. Consequently, a space volume occupied by the winding wire of the excitation winding section 5 can be increased. Further, a cross-sectional area of the yoke 7 can be partially enlarged so that magnetic flux can readily flow through the yoke 7. As for the first flange portion 23b, a portion where the ribs 23e exist is thicker than other portions. As a result, even if the flat plate-like body 23d of the first flange portion 23b is made thinner to enlarge a volume of the space for receiving the winding wire 25 as much as possible, it is possible to prevent the mechanical strength of the first flange portion 23b from being reduced.

Figure 5:
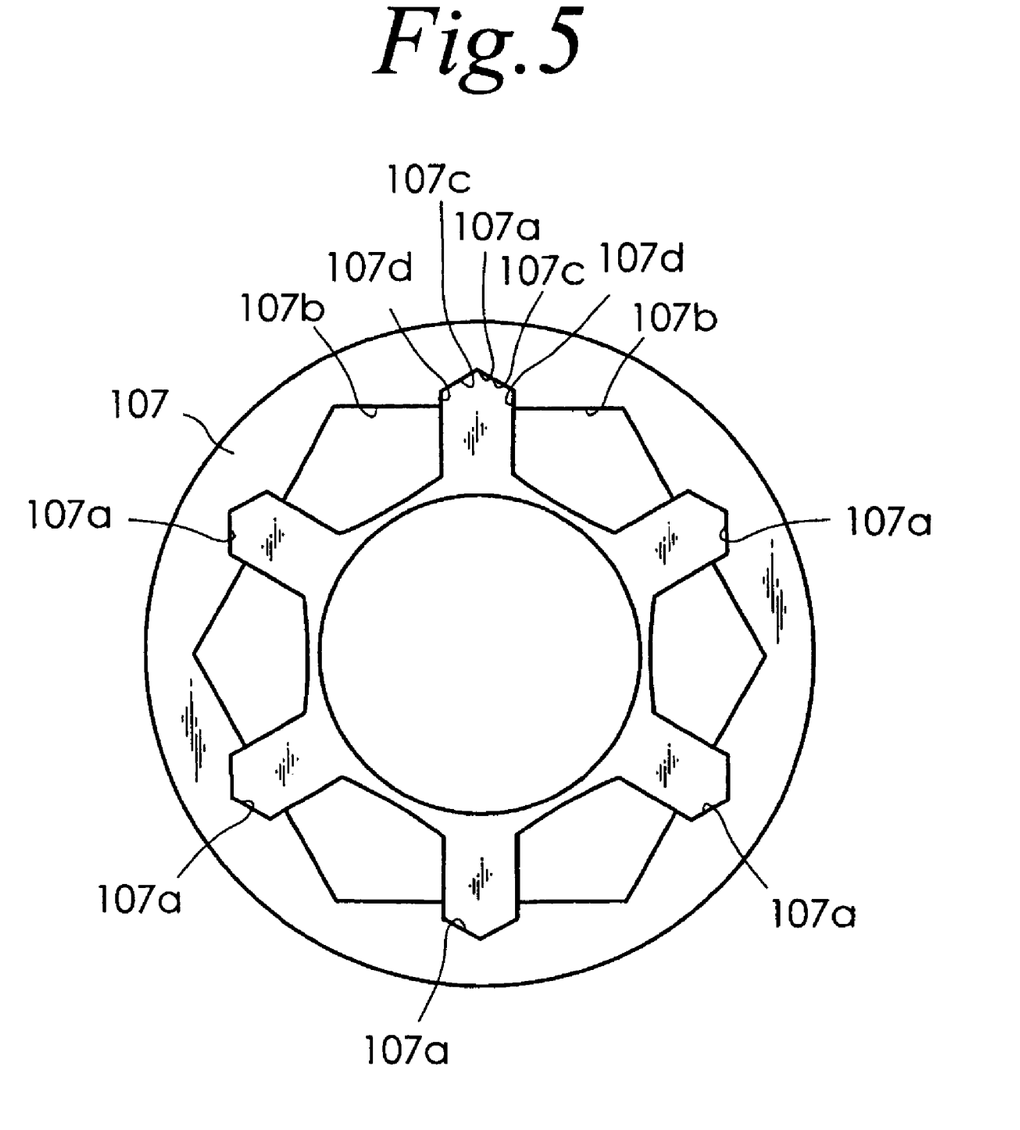
FIG. 5 is a front view of a stator core used in a stator for motors according to a reference example.

FIG. 5 is a front view of a stator core used in a stator of a reference example. The stator of the reference example has the same configuration as the stator of the first embodiment except for the shape of an inner surface of a fitted recess 107a. In this example, the inner surface of the fitted recess 107a is constituted by a pair of vertical surfaces 107d continuous with a pair of flat-surface portions 107b and extending at right angle to the pair of flat-surface portions 107b respectively, and a pair of inclined flat surfaces 107c continuous with the pair of vertical surfaces 107d respectively. Thus, also in the stator according to this example, a space volume occupied by the winding wire of the excitation winding section can be increased, thereby suppressing the lowering of magnetic flux density flowing through the yoke 107. However, since the fitted recess 107a of the yoke 107 is not fitted with a part of a first flange portion of a bobbin, such advantage cannot be expected that the thickness dimension of the first flange portion can be reduced, in contrast with the first embodiment.

Figure 6:
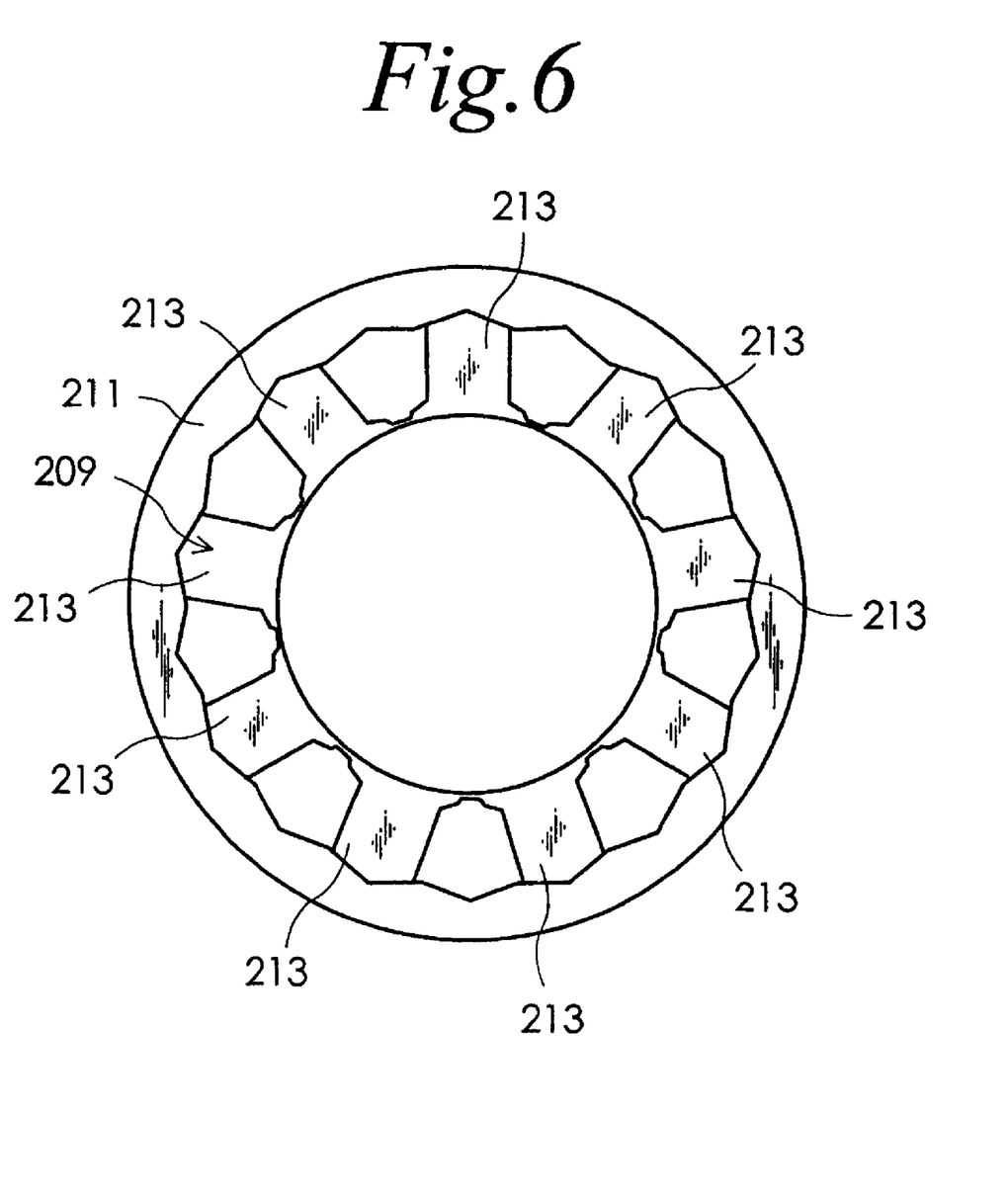
FIG. 6 is a front view of a stator core used in a stator for motors according to a second embodiment of the present invention.

FIG. 6 is a front view of a stator core used in a stator according to a second embodiment of the present invention. This embodiment is a nine-slot stator provided with nine pole columns 213. Since the stator of the second embodiment has basically the same configuration as the stator of the first embodiment except for the number of the pole columns, reference numerals of 200 added to those of the first embodiment are used in this embodiment, and the descriptions thereof are omitted.

Further, the present invention is not limited to these embodiments, but various variations and modifications may be made without departing from the scope of the present invention.

What is claimed is:

1. A stator for motors comprising:
a stator core including an annular yoke and a magnetic pole constituent member arranged inside the annular yoke; and
N excitation winding sections (N is an integer of three or more) arranged at the magnetic pole constituent member,
the magnetic pole constituent member including:
N pole columns arranged inside the annular yoke at an interval in a circumferential direction of the yoke and mounted respectively with the excitation winding sections, the pole column having one end connected to the yoke and the other end positioned on an inner side than the one end in a radial direction of the yoke;
a plurality of magnetic pole surface constituent sections respectively formed on the other ends of the pole columns, each plurality of magnetic pole surface constituent section having an inner side that includes a magnetic pole surface; and
a plurality of connecting portions respectively connecting two adjoining sections among the magnetic pole surface constituent sections,
the yoke and the magnetic pole constituent members being respectively formed by overlaying a plurality of magnetic steel plates;
the yoke having an inner peripheral surface portion in which N fitted recesses are formed to be open toward both sides of an overlaying direction of the plurality of magnetic steel plates and also toward the magnetic pole constituent member, and are respectively fitted with the one ends of the N pole columns,
wherein a pair of flat-surface portions are formed continuously with an inner surface of the fitted recess, the flat-surface portions being respectively disposed on either side of the fitted recess in the circumferential direction;
wherein the pair of flat-surface portions are located on the same virtual plane, having a side of an identical dimension that extends in the circumferential direction,
wherein a cross-sectional shape of the inner peripheral portion of the yoke, as taken in a direction orthogonal to the overlaying direction of the magnetic steel plates, is a polygon having N sides, with the N fitted recesses respectively formed in substantially a center of each respective side of the N-side polygon;
wherein the one end of the pole column is a triangle in shape; and
wherein the excitation winding section includes a bobbin to be fitted with the pole column in such a manner that a part of the bobbin is fitted into a space formed between the fitted recess and the pole column fitted into the fitted recess.

2. The stator for motors according to claim 1, wherein, when a distance between an apex of the triangle shape portion of the one end of the pole column and a central point of the stator core is defined as R, a width dimension in a direction orthogonal to an extending direction from the one end to the other end of the pole column as T, a distance between a base of the triangle shape portion of the pole column and the central point as x, and a distance between the central point and a point of intersection where a virtual line, which orthogonally crosses one side of the regular N-polygon and passes through the central point, intersects with the one side of the regular N-polygon as H, the N, the T, and the R satisfy a relationship of $T \leq 2R(1-\cos(\pi/N))/\tan(\pi/N)$, and
wherein the H, the x, and the R satisfy a relationship of $H < x < R$.

3. The stator for motors according to claim 2, wherein the excitation winding section includes the bobbin made from an insulating material and fitted with the pole column, and a winding wire wound around the bobbin,
wherein the bobbin includes a cylindrical portion which is fitted with the pole column and around which the winding wire is wound, a first flange portion arranged on one end of the cylindrical portion to be in contact with an inner peripheral surface of the yoke, and a second flange portion arranged on the other end of the cylindrical portion to be in contact with the magnetic pole surface constituent section; and
wherein the fitted recess and the first flange portion of the bobbin are shaped so that the part of the first flange portion may be fitted into the fitted recess.

4. The stator for motors according to claim 3, wherein
the first flange portion includes a flat plate-like body arranged along the inner peripheral surface of the yoke, and a pair of ribs rising from the body toward the yoke;

wherein the inner surface of the fitted recess is constituted by a pair of inclined flat surfaces which are respectively continuous with the pair of flat-surface portions; and wherein sides of the pair of inclined flat surfaces that extend in the circumferential direction are sized to form a pair of spaces between the pair of inclined flat surfaces and the one end of the pole column fitted into the fitted recess so that the pair of ribs of the bobbin may respectively be fitted into the pair of spaces.

5. The stator for motors according to claim 3, wherein an inner surface of the first flange portion of the bobbin and that of the second flange portion of the bobbin face each other and extend in parallel to each other, and the winding wire is wound around the cylindrical portion in a regular winding manner.

6. The stator for motors according to claim 4, wherein an inner surface of the first flange portion of the bobbin and that of the second flange portion of the bobbin face each other and extend in parallel to each other, and the winding wire is wound around the cylindrical portion in a regular winding manner.

* * * * *